United States Patent [19]

Bishop

[11] Patent Number: 5,765,174
[45] Date of Patent: Jun. 9, 1998

[54] SYSTEM AMD METHOD FOR DISTRIBUTED OBJECT RESOURCE MANAGEMENT

[75] Inventor: Alan G. Bishop, Mountain View, Calif.

[73] Assignee: Sun Microsystems, Inc., Palo Alto, Calif.

[21] Appl. No.: 539,968

[22] Filed: Oct. 6, 1995

[51] Int. Cl.⁶ .................................................. G06F 17/30
[52] U.S. Cl. ................................ 707/206; 707/205
[58] Field of Search .................... 395/621, 622; 707/205, 206

[56] References Cited

U.S. PATENT DOCUMENTS

| | | | |
|---|---|---|---|
| 4,989,134 | 1/1991 | Shaw | 395/622 |
| 5,274,804 | 12/1993 | Jackson et al. | 395/622 |
| 5,295,256 | 3/1994 | Bapat | 395/500 |
| 5,398,334 | 3/1995 | Topka et al. | 395/622 |
| 5,511,196 | 4/1996 | Shackelford et al. | 395/683 |
| 5,560,003 | 9/1996 | Nilsen et al. | 395/622 |

OTHER PUBLICATIONS

Henry Lieberman et al., "A Real–Time Garbage Collector Based on the Lifetimes of Objects," Communications of the ACM, vol. 26 No. 6, Jun. 1983, pp. 419–429.

"The Java Language Specification", Release 1.0 Alph3, May 11, 1995, Sun Microsystem Computer Corporation, pp. 1–35.

"Java and Internet Programming", Dr. Dobb's Journal, Aug. 1995, pp. 55–61 and 101–102.

"The Coming Software Shift Telecom", by George Gilder, Aug. 28, 1995, pp. 147–162.

"The Internet becomes multimedia–savvy: Macromedia, Sun nabe Netscape Navigator", by Jason Snell, MacUser, Sep. 1995, vol. 11, No. 9, p. 31(1).

"OSF Opens Software Web Mall For Java", Newsbytes, Jul. 26, 1995.

"Complex Browsers Seek to Expand Role", (World Wide Web browsers, by Scott R. Raynovich, LAN Times, Jul. 3, 1995, vol. 12, No. 13, p. 1(2).

"Sun, Netscape to wake up Web users", (Sun Microsystems license its Java World Wide Web development language to Netscape Communications Corp), Scott R. Raynovich, LAN Times, Jun. 19, 1995, vol. 12, No. 12, p. 44(1).

"Internet access: Sun unveils most complete set of Internet business solution available today; Internet pioneer delivers on challenge of electronic commerce", EDGE: Work–Group Computing Report, May 29, 1995, vol. 6, No. 262.

(List continued on next page.)

*Primary Examiner*—Paul V. Kulik
*Attorney, Agent, or Firm*—Gary S. Williams; Flehr Hohbach Test Albritton & Herbert LLP

[57] ABSTRACT

A distributed object oriented computer system that has two classes of object references: strong references and weak references. Weak references (or pointers) allow users to refer to an object, but does not prevent the object manager from deleting the object. A weak object reference can be converted into a strong object reference by execution of a "MakeStrong" operation, which generates a strong reference, and then deleting the weak reference. A strong object reference can be converted into a weak object reference by execution of a "MakeWeak" operation, which returns a weak reference to the object referred to in the operation's argument, and then deleting the strong reference. When an object no longer has any outstanding strong object references, deletion of the object is enabled. In another aspect of the invention, a portion of the computer's memory is set aside for a primary linker cache and a secondary linker image cache. Linker images, generated while loading programs for execution, are stored in the primary and secondary linker caches. Each linker image in the primary linker cache has strong object references to objects included in corresponding ones of the loaded programs, and each linker image in the secondary linker cache has weak object references to objects included in corresponding ones of the loaded programs.

15 Claims, 7 Drawing Sheets

OTHER PUBLICATIONS

"Sun takes a new shape" (Sun Microsystems strategy fot its UltraSPARC microprocessor), by Jim DeTar, Electronic News (1991), May 29, 1995, vol. 41 No. 2067, p. 1(2).

"HotJava could become a lot hotter that just a Web browser for animations" (Sun Microsystems HotJava Web browser) (Distributed Thinking), by Stewart Alsop, InfoWorld, May 29, 1995, vol. 17, No. 22, p. 94(1).

"Sun Microsystems Bringing Interactive Technology to the WWW", by Michael Goulde, Open Information Systems, Mar. 1995, vol. 10, No. 3, p. 29(3).

"Hi-resolution" (New Year's resolutions), by Gil Schwartz, PC-Computing, Jan. 1995, vol. 8, No. 1, p. 77(1).

"The Common Object Request Broker: Architecture and Specification", (COBRA V2.0) Revision 2.0, Jul. 1995.

"A Spring Collection", (A Collection of Papers on the Spring Distributed Object-Oriented Operating System), SunSoft, Sep. 1994.

"The Java Language Environment", by James Gosling and Henry McGilton, May 1995, pp. i-65.

PRIOR ART

| FIGURE 7A |
|---|
| FIGURE 7B |

SYSTEM AMD METHOD FOR DISTRIBUTED OBJECT RESOURCE MANAGEMENT

The present invention relates generally to object oriented operating systems, and particularly to a system and method for facilitating the deletion of objects.

BACKGROUND OF THE INVENTION

A distributed object based computer system must provide some way of informing object managers when they may safely destroy their objects and reclaim their resources. Common solutions include reference counting, which keeps count of references to each object and deletes an object when its reference count decreases to zero, and garbage collecting, which deletes an object when the system can prove that there are no remaining references to an object.

However, such strategies fail for a certain class of references where the object's user wishes to keep a reference to an object without preventing its deletion and resource reclamation. This class of reference occurs in caches of computed values, where the computed value may be safely recomputed, object browsers, where the act of viewing an object should not prevent that object from being deleted from the system, and other scenarios.

SUMMARY OF THE INVENTION

In summary, an embodiment of the present invention is a distributed object oriented computer system in which the object oriented operating system provides for the destruction of object resources through the use of two classes of object references: strong references and weak references. Weak references (e.g., pointers) allow users to refer to an object, but does not prevent the object manager from deleting the object.

In systems using a reference counting methodology, an object is queued for deletion when the count of strong references to the object reaches a predefined threshold value. In systems using a garbage collection methodology, any object having no outstanding strong object references (with the possible exception of one reference held by the object's object manager) will be garbage collected and thereby deleted at the time of the next garbage collection cycle.

A weak object reference can be converted into a strong object reference by execution of a "MakeStrong" operation, which generates a strong reference, and then deleting the weak reference. The MakeStrong operation checks to see if the object referred to still exists, and returns a strong reference if the object still exists. A strong object reference can be converted into a weak object reference by execution of a "MakeWeak" operation, which returns a weak reference to the object referred to in the operation's argument, and then deleting the strong reference. When an object no longer has any outstanding strong object references, deletion of the object is enabled.

The present invention incurs no additional distributed communication costs to users of objects who do not wish to use the new "weak" class of object references because those users use only the normal strong object reference mechanisms. Furthermore, an object manager in a distributed system using the present invention does not have to keep a list of object users, and the object manager does not need to engage in any distributed communications when it destroys objects.

More specifically, in a preferred implementation of the present invention, for each object stored in the memory, the operating system's nucleus stores reference count data representing the number of strong object references to the object. The reference count data is decremented for an object whenever a strong object reference to the object is destroyed. Furthermore, deletion of an object is initiated whenever the reference count data of the object is decremented to a predefined threshold value, without regard to how many weak object references to the object may exist.

In another aspect of the invention, a portion of the computer's memory is set aside for a primary linker cache and a secondary linker image cache. Linker images, generated while loading programs for execution, are stored in the primary and secondary linker caches. Each linker image in the primary linker cache has strong object references to objects included in corresponding ones of the loaded programs, and each linker image in the secondary linker cache has weak object references to objects included in corresponding ones of the loaded programs.

When the primary linker cache is full and space for another linker image is needed in the primary linker cache, a linker image is moved from the primary linker cache to the secondary linker cache (to make room for the other linker image) and the strong object references in the moved linker image are converted into weak object references. The weak object references in the linker images in the secondary linker cache do not prevent deletion of the referenced objects, thereby allowing the corresponding resources to be released if they are not referenced by any strong object references elsewhere in the system.

When a linker image in the secondary linker cache is to be used to initiate execution of a corresponding program, the linker image is moved from the secondary linker cache to the primary linker cache and the weak object references in the moved linker image are converted into strong object references.

BRIEF DESCRIPTION OF THE DRAWINGS

Additional objects and features of the invention will be more readily apparent from the following detailed description and appended claims when taken in conjunction with the drawings, in which:

FIG. 7 comprising

DESCRIPTION OF THE PREFERRED EMBODIMENTS

Figure 1:
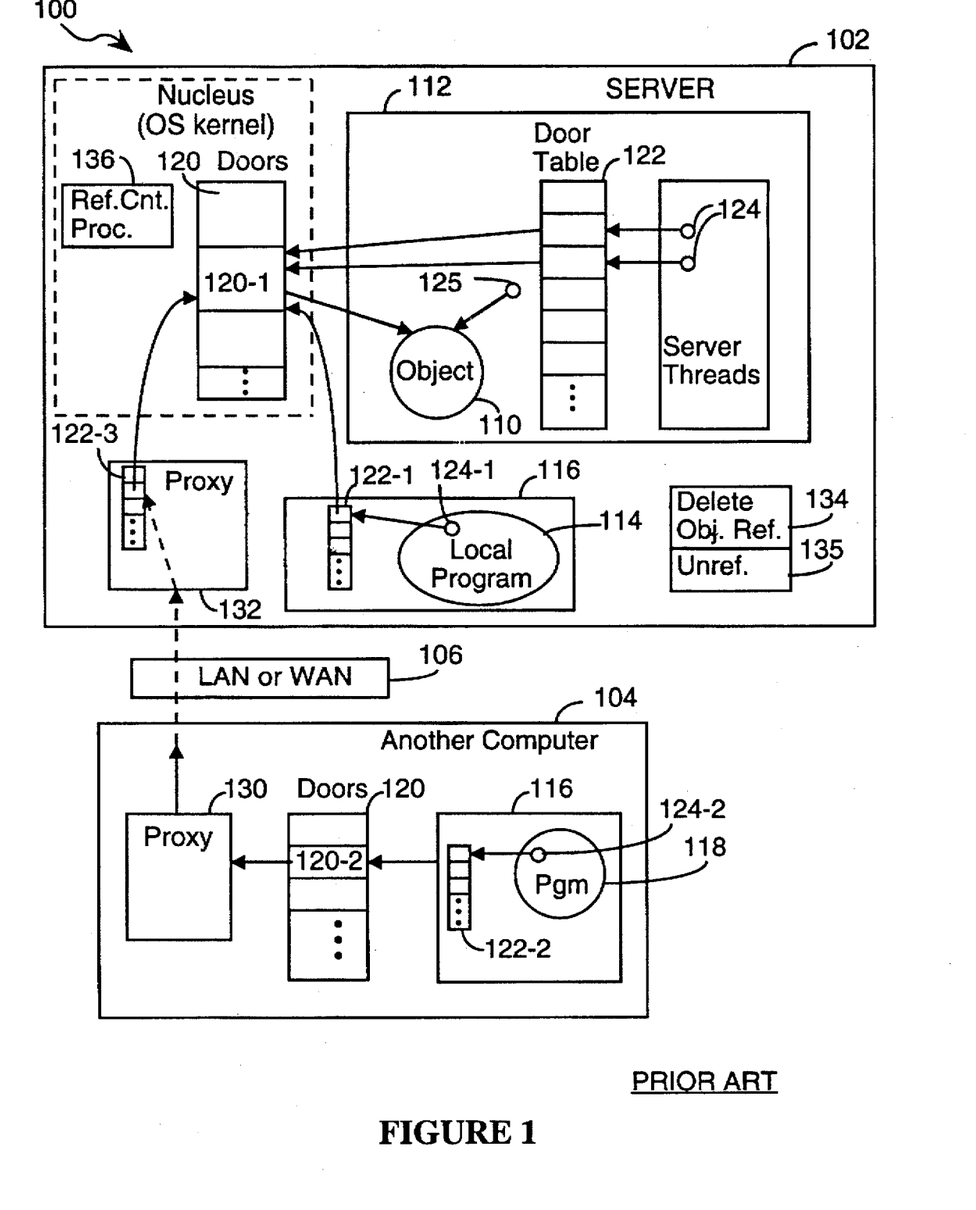
FIG. 1 is a block diagram of a prior art multi-computer system using an object oriented operating system and an object dereferencing procedure for deleting objects no longer referenced by any other objects.

Referring to FIG. 1, there is shown a distributed computer system 100 including at least one file server computer 102 and at least one workstation or other end user computer 104 that communicate via a communications network 106, such as a local area network, a wide area network, or a combination of networks. As shown in FIG. 1, references to an object 110 stored on the file server 102 can be made from data structures within the server's main operating system domain 112, a local program 114 running in a separate domain 116 on the file server 102, as well as programs 118 running on other computer platforms in the system such as a workstation 104.

A domain is defined to be a process with its own address space. A domain can have multiple threads of execution (usually called threads).

In the preferred embodiment, the operating system used is the Spring operating system, which is a product of Sun Microsystems, Inc. Background information on the Spring operating system can be found in "The Spring Nucleus: A microkernel for objects," Proceedings of the 1993 Summer Usenix Conference, June 1993; and "An Overview of the Spring System," Proceedings of Compcon Spring 1994, February 1994, both of which are hereby incorporated by reference.

Cross-domain references to objects and some in-domain references, often called object pointers or object references, are preferably made via two data structures called doors 120, and door tables 122.

Object Access via Doors

Doors 120 are the mechanism for issuing cross-domain calls to objects. If a domain is granted access to a door, one the domain's threads may subsequently issue a cross-domain call through the door to the object referenced by that door. When the nucleus of the operating system executes the door call, it also records some return information within the nucleus. This return information consists of the caller's domain, the program counter to which to return after the call, and the stack pointer of the caller at the time it issued the call. After the call has completed, the called domain will execute a door return and the nucleus will use the previously recorded return information to return control to the caller.

Doors are pieces of protected nucleus state. Each domain has an associated door table 122 maintained by the nucleus for the domain. A domain references doors using door identifiers 124, which are mapped through the domain's door table 122 into actual doors 120. A given door may be referenced by several different door identifiers in several different domains. Thus, the actual doors themselves are not in the address space of the user accessible domains, but each domain does include a door table 122 that is used to map door identifiers into actual doors. Furthermore, the doors referenced by the door table in any one domain can point to objects in other domains. For example, a local program 114 running in domain 116 can contain a door identifier 124-1 that is mapped by its domain-specified door table 122-1 to a specific door 120-1, which in turn enables access to an object 110 in a different domain 112 from the local program 114.

When a door identifier (see 124-2) references an object (e.g.,110) resident on another computer (e.g., 102) in the distributed system 100, the corresponding door 120-2 (as mapped by door table 122-2) actually points to a proxy 130, which communicates with another proxy 132 on the computer in which the referenced object resides. That proxy 132, in turn, contains a door table 122-3 that references a door 120-3 on the same computer as the object being referenced.

Possession of a valid door identifier 124 gives the possessor the right to send an invocation request to the given door. A valid door identifier can only be obtained with the consent of the target domain or with the consent of someone who already has a door identifier for the same door.

In addition to cross domain object references implemented as door identifiers, the system 100 includes local object references 125 to objects in the same domain as the object.

Object Deletion

Many servers are interested in knowing when all the customers for a given object have destroyed all their references to the object, so that they can safely destroy the object and free any resources that the object is using in the server's address space. Clients generally cannot issue explicit object deletion requests because an object cannot be deleted while it is still in use by other domains.

Instead, a simple reference counting mechanism is used. Whenever a domain is granted access to an object via the creation of an additional object reference, the object's reference count is incremented by the operating system. Whenever a domain loses access to an object (either voluntarily, or due to the domain crashing, or due to the door being revoked), the operating system decrements the reference count for the object. When the reference count is decremented from 2 to 1, the nucleus notes that it should deliver an "unreferenced" call on the corresponding object to its server. A count of "1" is used as the value for unreferencing an object because it is normal for the object's object manager to retain a reference to each object that it implements.

To support these object maintenance services, each participating computer will include an object reference deletion procedure 134, an unreference procedure 135 for deleting objects for which there are no longer any references, and the nucleus will include a reference counting procedure 136 that increments and decrements each object's reference count as object references to the object are created and deleted and which sends an unreferenced call to an object's server when the reference count for the object is decremented to a value of 1.

The nucleus keeps a queue of unreferenced doors for each domain, and uses a single nucleus thread per domain to process that queue and to call into the domain to deliver an unreferenced call on each of these unreferenced doors. Unreference calls are made by the domains in which the corresponding objects reside, thereby allowing an orderly processing of unreference calls when many doors may become unreferenced simultaneously, for example, due to a client domain exiting.

An unreferenced call notifies an object's server that there are no remaining object references to the object. The server may then remove its reference to the object, delete the door, and delete the object itself. In the preferred embodiment of the invention, the deletion of the door and object are normally performed immediately upon the execution of an unreferenced call on the door. In a garbage collection based system, the object's server would normally respond to an unreferenced call by deleting the door. Deletion of the corresponding object would occur during the next garbage collection cycle, at which time all objects with no remaining references are garbage collected.

Cached Object References

Figure 2:
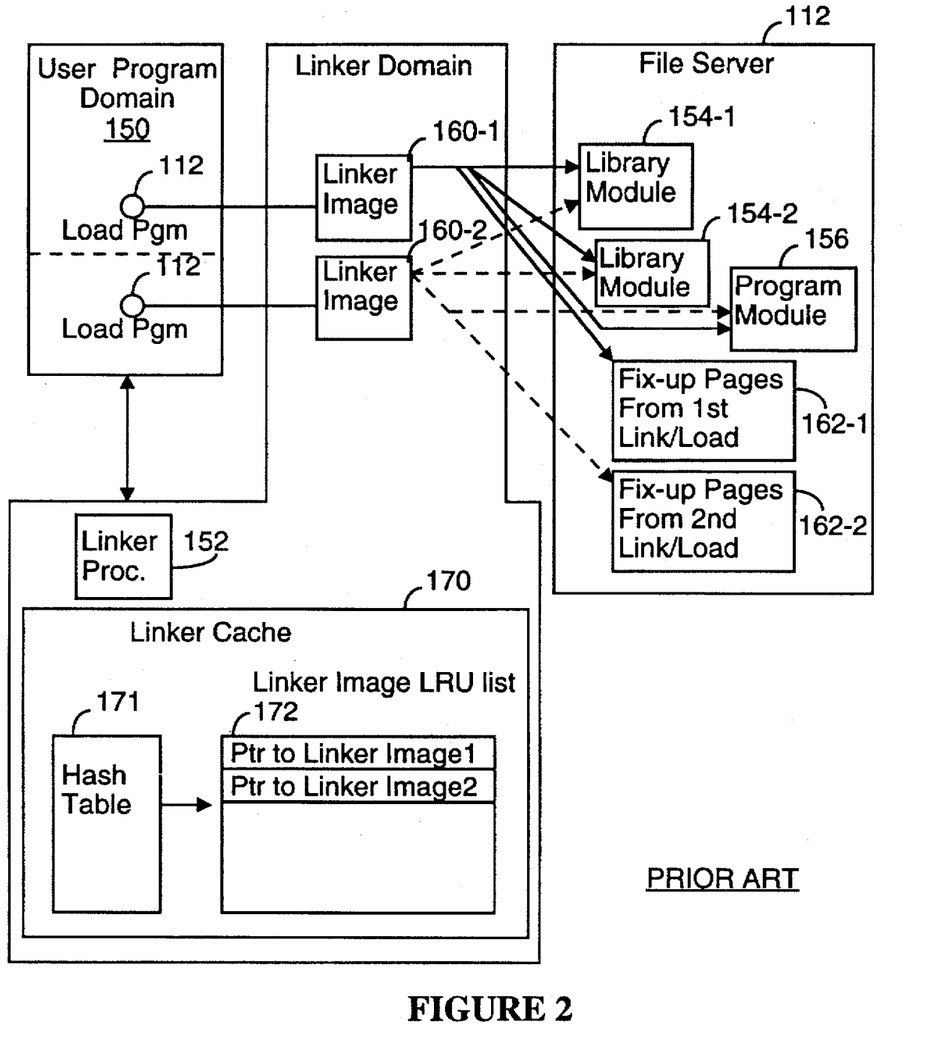
FIG. 2 is a block diagram of the data structures associated with a typical linked procedure.

Referring to FIG. 2, when a program in a user domain 150 calls for the loading of a program a linker procedure 152 is invoked. The linker procedure 152 locates all the library procedure files 154 and program files 156 needed to create an executable representation of the program to be loaded, and generates a "linker image" 160-1 that points to all the located files. In addition, the linker generates a set of fix-up pages 162-1 which represent pages of the program files and library procedure files modified by the linker procedure in order to generate an executable program. For the purposes of this explanation, it can be assumed that the set of fix-up pages generated in response to a load program command are treated as a single object, and that the linker image 160-1 also points to the set of fix-up pages 162-1.

The linker images are implemented as objects, and a linker cache 170 is used to store object references to the linker images 1 60. Each of the "pointers" in the linker images is itself an object reference, which is implemented as a door identifier in the preferred embodiment whenever the object reference is a cross domain object reference, as explained above. In addition, the user program domain 150 also maintains object references to all the program and library modules and the fix-up pages so long as it continues to execute the loaded program. These object references prevent deletion of any of the objects referenced by the linker image and the user program domain so long as those object references are not relinquished.

The linker cache 170 has a limited capacity, typically sufficient to hold references to about fifty or so linker images 160. The linker 152 maintains a hash table 171 and a list 172 of the cached linker images in "least recently used" order (i.e., each time a linker image is used, it is moved to the head of the list). The hash table 171 is a conventional hash table used to quickly locate items in the LRU list 172. When the linker cache 170 is full, and another linker image needs to be generated in response to a load program command, the reference in the LRU list 172 to the least recently used linker image is deleted and the resulting space is used to store a reference to a linker image for the newly load program. Deletion of an object reference in the LRU list 172 enables deletion of the corresponding linker image 160 when all user program domains also relinquish their references to the linker image.

The above described program linking methodology can result in the production and storage of multiple sets of fix-up pages 162 for a single program. In particular, if a program is loaded once, and then kept in use for a long period of time, but no other load requests for the same program are invoked, the linker image 160 for the program will eventually be deleted because it will be the least recently used linker image, even though the underlying program continues to execute. For instance, a user might load a X-windows utility program, and then leave his terminal on for days without reloading that program. When, a day to two later, a second user loads the same program, the linker image for the program will have been deleted. The second user will be unable to access the linked version of the program produced in response to the load by the first user (because its linker image 160-1 has been deleted) and the linker 152 will therefore be invoked to generate a new linked version of the program. This results in the generation of a new linker image 160-2 and also a new set of fix-up pages 162-2. As a result, the program which is now being executed by two users has two identical sets 162-1, 162-2 of fix-up pages.

While each linker image 160 tends to be very small, the set of fix-up pages 162 for each loaded program tend to be voluminous. Thus it is undesirable to have multiple identical sets of fix-up pages for the same program. However, the first set of fix-up pages cannot be deleted because the first user continues to execute the program using that first set of fix-up pages.

While the frequency of this "multiple identical sets of fix-up pages" problem could be reduced by greatly increasing the size of the linker cache, that would be undesirable because it would prevent the deletion of the fix-up pages for programs no longer in use, thereby making a poor use of memory resources. Also, this would not represent a complete solution because some linker images would still be flushed from the system as more and more programs are loaded. In fact, from the viewpoint that the fix-up pages for programs no longer in use should be deleted as soon as possible, it would be desirable to make the linker cache 170 smaller, not larger.

Inadvertent Object Retention

Referring again to FIG. 1, consider the situation where the program 118 on the client computer is an object browser. The user of the client computer, with the assistance of the browser 118, views an object 110 on the server 102. This creates a strong object reference, in the form of a door identifier in the corresponding proxy 132. As a result, even after the browser moves on to look at other objects on either the same or another server, the object reference may continue to exist and thereby prevent deletion of the object. Unless the client computer makes an explicit command to consume or otherwise delete the object reference for the object, the object reference in the proxy may be maintained until the calling domain in the client computer terminates.

Weak Object References

Figure 3:
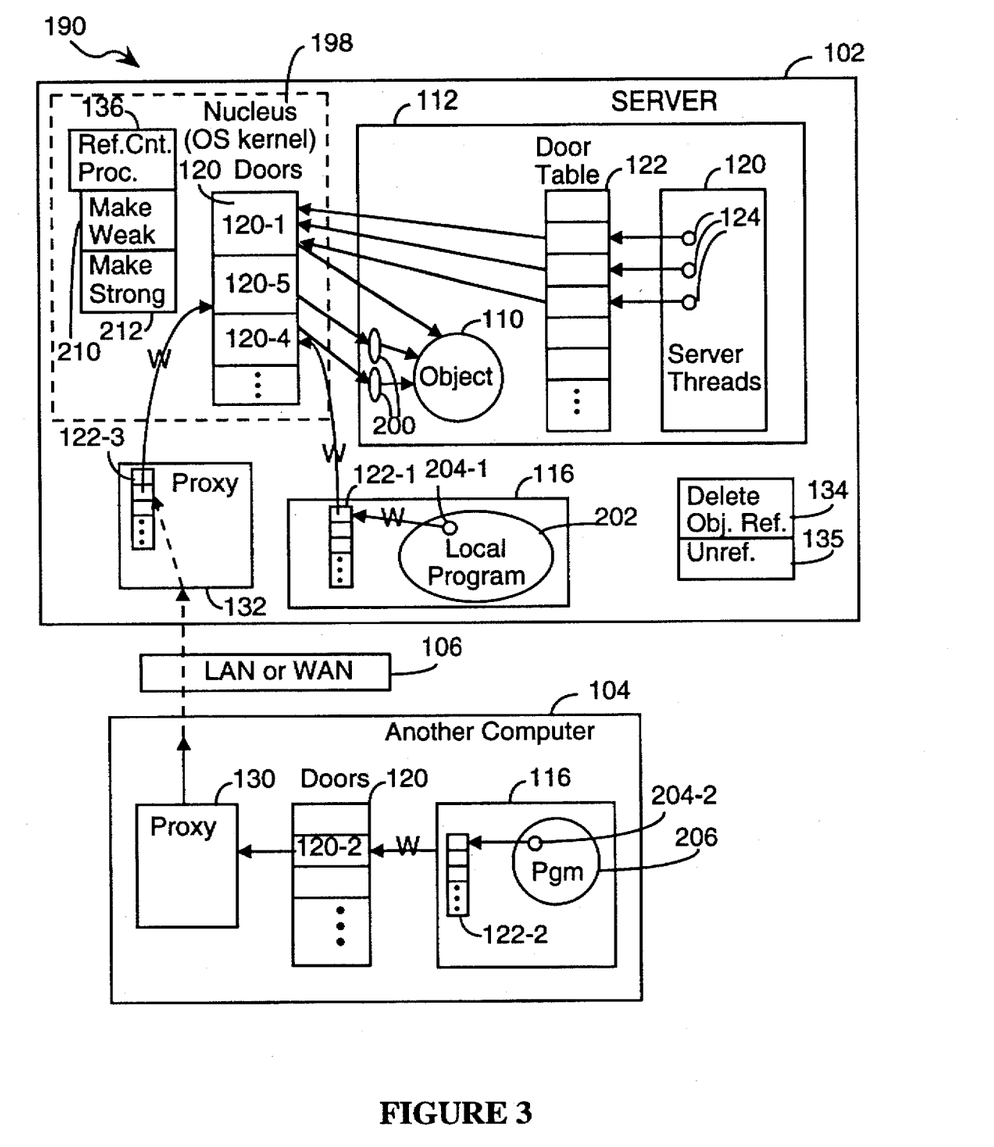
FIG. 3 is a block diagram of a multi-computer system using an object oriented operating system that supports strong and weak object references in accordance with an embodiment of the present invention.

Referring to FIG. 3, the present invention modifies the system described with reference to FIGS. 1 and 2 to support both regular or strong references to objects, as well as weak object references. In the modified system 190, strong object references are defined as references that prevent the deletion of the referenced object. That is, whenever at least one strong reference to an object remains in existence, the operating system kernel 198 will not delete that object. However, weak references to an object will not prevent an object from being deleted.

Weak references to an object, such as weak references to object 110 in FIG. 3, are implemented in the preferred embodiment as object references to a special class of objects called "companion" objects 200. The only function of a companion object 200 is to point to another object, such as object 110. As shown in FIG. 3, local program 202 contains a weak object reference (door identifier 204-1) and remotely located program 206 also contains a weak object reference (door identifier 204-2) to object 110 in the server 102. These weak object references point to two doors 120-4 and 120-5 in the server, which in turn point to two companion objects 200. Each of the companion objects 200 contains a pointer to the referenced object 110.

The object deletion methodology of the system 190 remains unchanged. Thus, object 110 is not deleted so long as any door to the object has a reference count greater than 1. However, the weak object references are actually pointers to the companion objects 200, and thus existence of one or more doors pointing to the companion object 200 does not affect the reference count for object 110. Therefore, if no other object references to the object 110 existed other than the two weak object references, none of the doors to object 110 would have a reference count greater than one and thus the object 110 would be available for deletion. More specifically, when the last strong reference to object 110 is deleted, causing the associate door's reference count to decrease from 2 to 1, the operating system nucleus will make a call to the unreference procedure 135 of the object's server, putting that object on a queue of objects to be deleted by the server.

Similarly, normal reference counting is used to control the deletion of companion objects 200. That is, when the object holding the corresponding weak object reference (i.e., door identifier) to a companion object releases the weak object reference, the only remaining reference to the companion object will be the reference from object manager for companion objects (not shown in the Figs.). As a result the reference count for the companion object's door will decrease from 2 to 1 when the weak object reference is released, making the companion object available for deletion.

In the preferred embodiment, every time a new weak object reference is created by an entity a new companion object is created. This is true regardless of whether the new weak object reference is created by an entity on the same computer or a different computer from the referenced object.

Each server supporting weak references includes two special procedures for handling the two classes of object references: a MakeWeak procedure 210 is used to generate a weak object reference corresponding to a specified strong object reference, and a MakeStrong procedure 212 is used to generate a strong object reference corresponding to a specified weak object reference.

Figure 4:
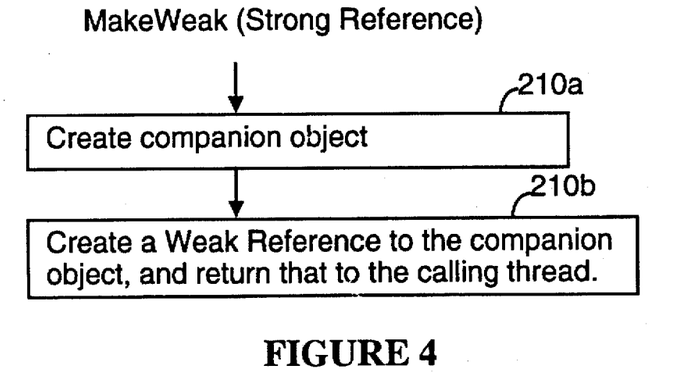
FIG. 4 is a flow chart of a preferred embodiment of a "MakeWeak" procedure for generating a weak object reference corresponding to a specified strong object reference.

Referring to FIG. 4, the MakeWeak function receives as an argument a strong object reference, which points directly or indirectly to an object. A corresponding weak object reference is generated by the MakeWeak procedure 210 by (A) creating a companion object for the referenced object (step 210a), and (B) creating a weak object reference to the companion object (step 210b), and returning that weak object reference to the calling thread. While the "weak object reference" is commonly referred to as an object reference to the corresponding non-companion object, in the preferred implementation the weak object reference is actually an object reference to a companion object.

Figure 5:
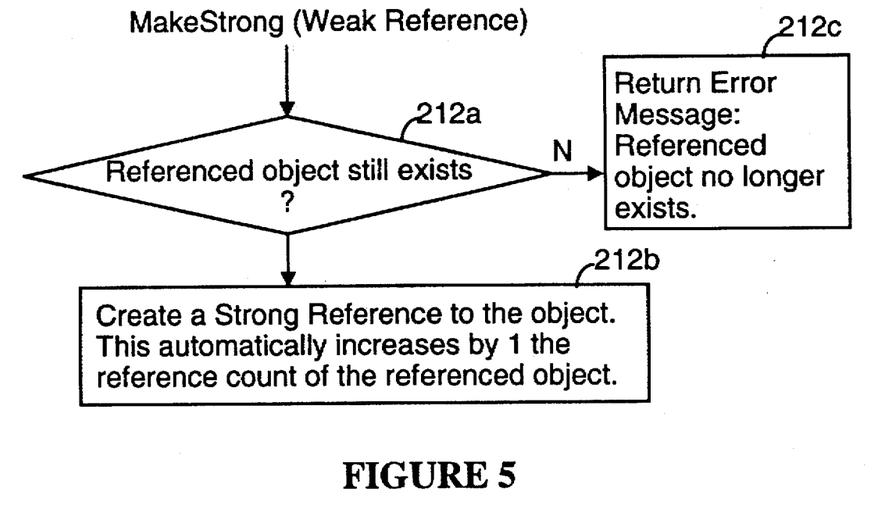
FIG. 5 is a flow chart of a preferred embodiment of a "MakeStrong" procedure for generating a strong object reference corresponding to a specified weak object reference.

Referring to FIG. 5, the MakeStrong function receives as an argument a weak object reference, which points to a companion object. A corresponding strong object reference is generated by the MakeStrong procedure by (A) checking to see if the non-companion object to be referenced still exists (step 212a), and (B) creating a strong object reference to the object referenced by the companion object (step 212b). In the preferred implementation, the generation of a strong object reference automatically increases by 1 the reference count of the referenced object. If the non-companion object corresponding to the specified weak object reference no longer exists (step 212a), the MakeStrong procedure exits with an error message return (step 210c).

Cached Strong and Weak Object References

Figure 6:
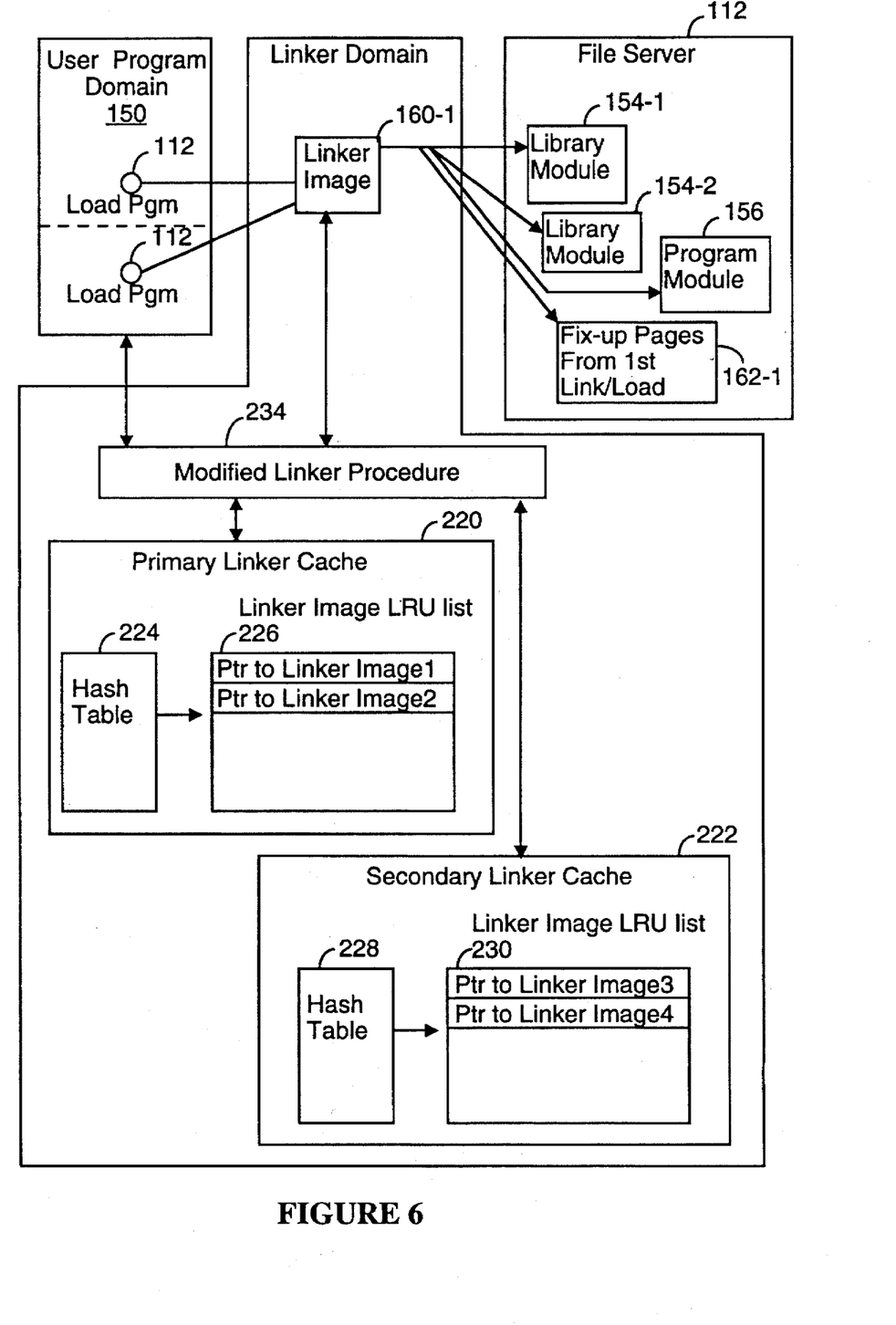
FIG. 6 is a block diagram of the data structures associated with linked procedures in a system incorporating an embodiment of the present invention.

Referring to FIG. 6, in the preferred embodiment the linker cache 170 of FIG. 2 is replaced with a smaller primary linker cache 220 and an expanded secondary linker cache 222. The primary linker cache 220 includes a hash table 224 and an LRU list 226 that stores strong object references to the least recently used linker images 160, while the secondary linker cache 222 includes a hash table 228 and an LRU list 230 that stores strong object references to the linker images 160 least recently used after the linker images referenced by the primary linker cache 220.

For ease of explanation, linker image objects 160 referenced by the LRU list 226 in the primary linker cache 222 are commonly referred to as "linker images in the primary linker cache", and linker image objects 160 referenced by the LRU list 230 in the secondary linker cache 222 are commonly referred to as "linker images in the secondary linker cache," even though the linker images themselves are not stored inside the linker caches. In addition, the object references stored in the LRU lists are sometimes said to "point" to various linker images, and the deletion of an item in an LRU list means that the corresponding object reference is deleted.

All object references in the linker images 230 in the primary linker cache 220 are strong object references, while all object references in the linker images 232 in the secondary linker cache 222 are weak object references. The object references in the LRU lists to the linker image objects are strong object references.

The linker cache 170 (see FIG. 2) in a typical prior art system is large enough to reference 50 or so linker images 160, while in a system 190 using the present invention the primary linker cache 200 is preferably large enough to reference only about 20 or so linker images and the secondary linker cache 222 is large enough to reference 200 or so linker images.

Thus, the 20 or so most recently used linker images are referenced by the LRU list 226 stored in the primary linker cache 220, while the next 200 or so most recently used linker images are referenced by the LRU list 230 stored in the secondary linker cache 232. When a new linker image is generated by the modified linker procedure 234, that causes all the items in the primary linker cache's LRU list 226 to be moved down one position in the list. If the primary linker cache 226 was full before the new linker image was generated, then the object reference to least recently used of the linker images in the primary linker cache will be moved into the secondary linker cache, and all the strong object references in the moved linker image are replaced by weak object references.

When a linker image is moved into the secondary cache, the objects referenced by the linker image are not automatically deleted, because other entities in the computer system may also be referencing those same objects. For instance, if a user process is still executing the program corresponding to the moved linker image, all the objects, referenced by the moved linker image will have strong object references held by that user process.

Figure 7:
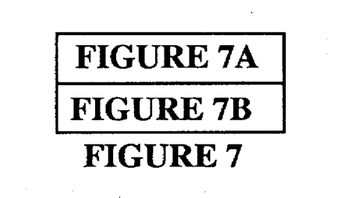
Figure 7A:
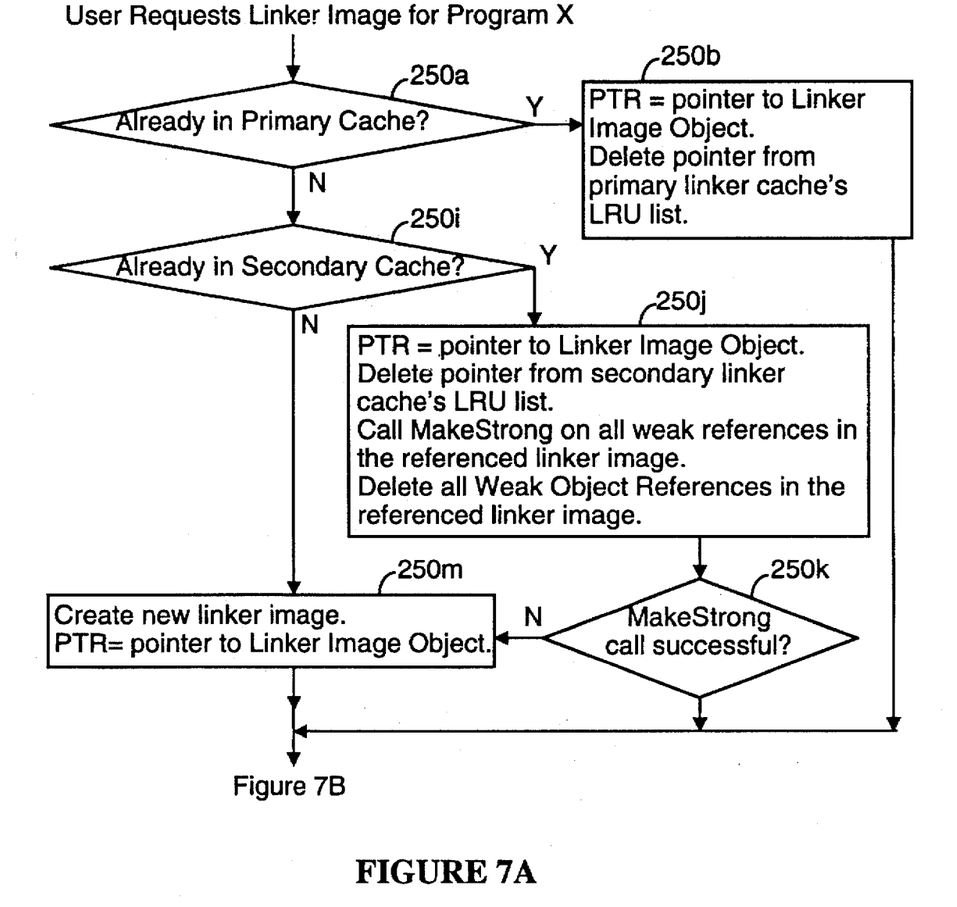
FIGS. 7A and 7B, is a flow chart of a preferred embodiment of a procedure for obtaining a linker image for a specified program using the methodology of an embodiment of the present invention.
Figure 7B:
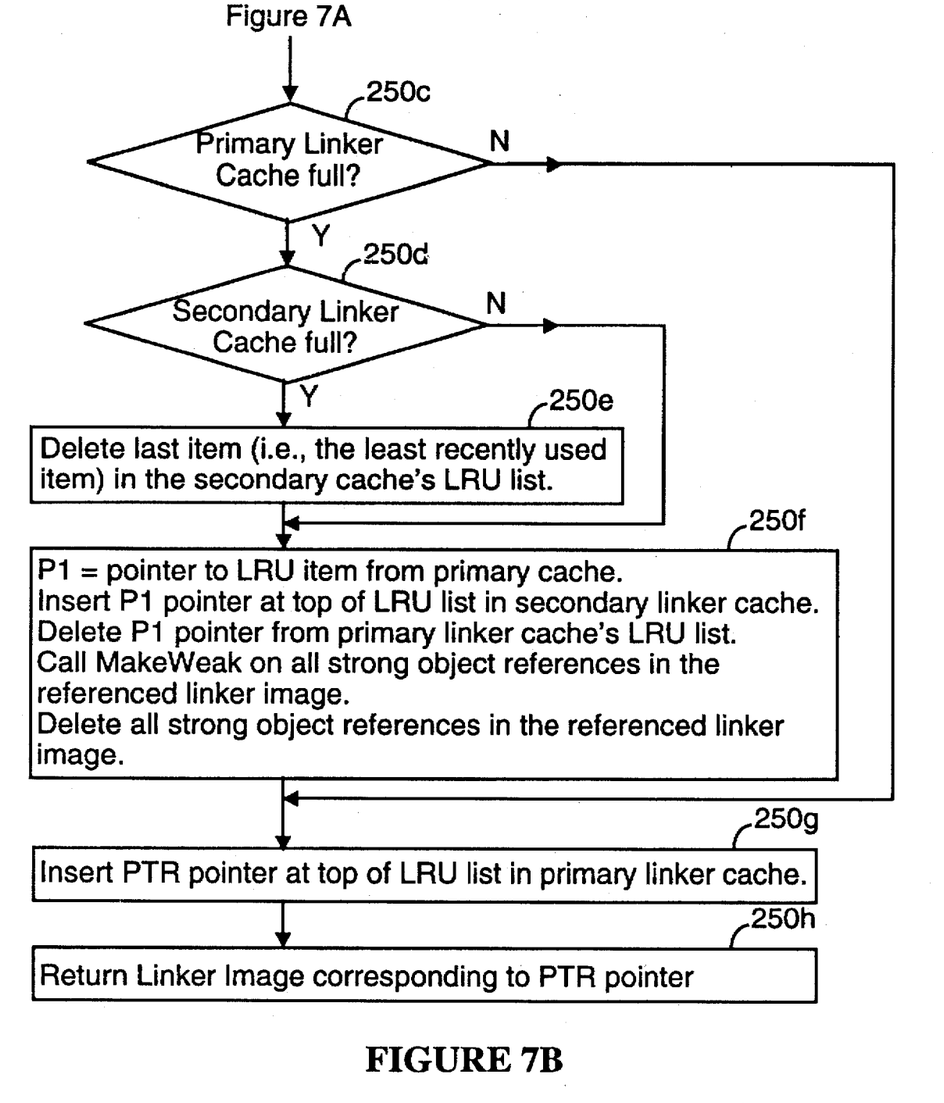

Referring to FIGS. 6 and 7, when a user program requests a linker image for a specified program, the modified linker procedure 234 checks to see if a linker image for the specified program is already in the primary cache (step 250a). If so, a reference PTR to the linker image is temporarily held by the linker procedure, and the reference to the linker image in the primary cache's LRU list is deleted (step 250b).

Steps 250c through 250f of the modified linker procedure serve to create room in the primary linker cache's LRU list 226, if such room is needed, for a reference to the linker image for the user specified program. In particular, if the primary linker cache is full (step 250c), and the secondary linker cache is full (step 250d), the last item in the secondary linker cache's LRU list is deleted (step 250e). Then the last item in the primary linker cache's LRU list 226 is inserted at the top of the secondary linker cache's LRU list 230 and deleted from the primary linker cache's LRU list 226 (step 250f). Furthermore, the MakeWeak procedure is called on all the strong object references in the linker image referenced by the item inserted at the top of the secondary linker cache's LRU list 230 to generate a corresponding set of weak object references, and all the strong object references in the referenced linker image are deleted (step 250f). As a result, all the strong object references in the linker image that was moved into the secondary linker cache 222 are replaced with corresponding weak object references.

Next, an object reference to the linker image for the user specified program is inserted at the top of the primary linker cache's LRU list 226 (step 250g) and then the linker image corresponding to that object reference is returned to the calling user program (step 250h).

If a linker image for the specified program is not already in the primary cache (step 250a), the secondary linker cache is checked (step 250i). If the linker image for the specified program is found in the secondary linker cache, a reference PTR to the linker image is stored, and the reference to the linker image in the secondary cache's LRU list 230 is deleted (step 250j). In addition, the MakeStrong procedure is called on all the weak object references in this linker image to generate a corresponding set of strong object references, and all the weak object references in the referenced linker image are deleted (step 250j). As a result, all the weak object references in the linker image removed from the secondary linker cache 222 are replaced with corresponding strong object references.

If the call to the MakeStrong procedure is successful (step 250k), the procedure continues processing at step 250c, as described above. If the call to the MakeStrong procedure fails (step 250k), that is typically because one or more of the objects referenced by the referenced linker image have been deleted, which can happen since the referenced linker image contained only weak object references. When the call to the MakeStrong procedure fails, a new linker image for the specified program is created (step 250m) and an object reference to that linker image is temporarily held by the linker procedure until it is inserted at the top of the primary linker cache's LRU list (at step 250g). Then procedure resumes processing at step 250c.

Finally, if a linker image for the specified program is not found in either the primary or secondary linker caches, a linker image for the specified program is created (step 250m) and an object reference to that linker image is temporarily held by the linker procedure until it is inserted at the top of the primary linker cache's LRU list (at step 250g). Then linker procedure resumes processing at step 250c.

ALTERNATE EMBODIMENTS

As mentioned above, in systems using a garbage collection methodology instead of a reference count methodology, any object having no outstanding strong object references (with the possible exception of one reference held by the object's object manager) will be garbage collected and thereby deleted at the time of the next garbage collection cycle. The present invention is implemented in such system by treating only strong object references as object references that prevent an object from being garbage collected. That is, only strong object references cause an object to be retained during garbage collection, while weak object reference do not cause an object to be retained during garbage collection.

In another alternate embodiment, two classes of object references could be supported directly, without the use of companion objects. In such a system, if reference counting is used the operating system would keep a reference count only of strong object references and would initiate the deletion of objects when the reference count is decremented to a threshold value. In garbage collection systems, weak object references would be ignored during the garbage collection process, thereby causing objects with only weak object references (as well as objects with no object references) not to be retained during garbage collection.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer system having a memory storing a plurality of objects, a method of determining when to delete ones of said objects, the steps of the method comprising:

storing in said memory strong object references to a plurality of said objects;

generating a weak object reference corresponding to a specified one of said objects;

in response to predefined commands, deleting specified ones of said strong object references;

enabling deletion of said one of said objects when less than a predefined threshold number of strong object references to said one of said objects exist in said computer system, without regard to how many weak object references to said one of said objects may exist;

setting aside in said memory a primary linker cache and a secondary linker image cache; and storing linker images, generated while loading programs for execution, in said primary and secondary linker caches, each linker image in said primary linker cache including strong object references to objects included in corresponding ones of said loaded programs, each linker image in said secondary linker cache including weak object references to objects included in corresponding ones of said loaded programs, said linker image storing step including:

moving a linker image from said primary linker cache to said secondary linker cache when said primary linker cache is full and space for another linker image is to stored in said primary linker cache;

moving a linker image from said secondary linker cache to said primary linker cache when said linker image is to be used to initiate execution of a corresponding program;

when moving a linker image from said primary linker cache to said secondary linker cache, replacing said strong object references in said moved linker image with corresponding weak object references; and when moving a linker image from said secondary linker cache to said primary linker cache, replacing said weak object references in said moved linker image with corresponding strong object references.

2. The method of claim 1, replacing a specified strong object reference to said one of said objects with a weak object reference by:

creating a companion object that includes a pointer to said one of said objects;

generating an object reference to said companion object; and destroying said specified strong object reference;

wherein said object reference to said companion object comprises a weak object reference to said one of said objects.

3. The method of claim 1,
for a plurality of objects stored in said memory, storing reference count data representing said strong object references to said objects;
decrementing said reference count data for one of said objects whenever a strong object reference to said one of said objects is destroyed; and
initiating deletion of said one of said objects when said reference count data for said one of said objects is decremented to a predefined threshold value.

4. In a computer system having a memory storing a plurality of objects, a method of determining when to delete ones of said objects, the steps of the method comprising:
storing in said memory strong object references to a plurality of said objects;
generating a weak object reference corresponding to a specified one of said objects;
in response to predefined commands, deleting specified ones of said strong object references;
enabling deletion of said one of said objects when less than a predefined threshold number of strong object references to said one of said objects exist in said computer system, without regard to how many weak object references to said one of said objects may exist; and
replacing a specified strong object reference to said one of said objects with a weak object reference by:
creating a companion object that includes a pointer to said one of said objects; wherein said pointer is not a strong object reference to said one of said objects;
generating an object reference to said companion object; and
destroying said specified strong object reference;
wherein said object reference to said companion object comprises a weak object reference to said one of said objects.

5. In a computer system having a memory storing a plurality of objects, a method of determining when to delete ones of said objects, the steps of the method comprising:
storing in said memory strong object references to a plurality of said objects;
for a plurality of said objects stored in said memory, storing reference count data representing said strong object references to said objects;
decrementing said reference count data for one of said objects whenever a strong object reference to said one of said objects is destroyed;
replacing a strong object reference to said one of said objects with a weak object reference, including decrementing said reference count data for one of said objects;
initiating deletion of said one of said objects when said reference count data for said one of said objects is decremented to a predefined threshold value, without regard to how many weak object references to said one of said objects may exist;
setting aside in said memory a primary linker cache and a secondary linker image cache; and
storing linker images, generated while loading programs for execution, in said primary and secondary linker caches, each linker image in said primary linker cache including strong object references to objects included in corresponding ones of said loaded programs, each linker image in said secondary linker cache including weak object references to objects included in corresponding ones of said loaded programs, said linker image storing step including:
moving a linker image from said primary linker cache to said secondary linker cache when said primary linker cache is full and space for another linker image is to be stored in said primary linker cache;
moving a linker image from said secondary linker cache to said primary linker cache when said linker image is to be used to initiate execution of a corresponding program;
when moving a linker image from said primary linker cache to said secondary linker cache, replacing said strong object references in said moved linker image with corresponding weak object references; and
when moving a linker image from said secondary linker cache to said primary linker cache, replacing said weak object references in said moved linker image with corresponding strong object references.

6. The method of claim 5,
replacing a specified strong object reference to said one of said objects with a weak object reference by:
creating a companion object that includes a pointer to said one of said objects;
generating an object reference to said companion object; and
destroying said specified strong object reference;
wherein said object reference to said companion object comprises a weak object reference to said one of said objects.

7. In a computer system having a memory storing a plurality of objects, a method of determining when to delete ones of said objects, the steps of the method comprising:
storing in said memory strong object references to a plurality of said objects;
for a plurality of said objects stored in said memory, storing reference count data representing said strong object references to said objects;
decrementing said reference count data for one of said objects whenever a strong object reference to said one of said objects is destroyed;
replacing a strong object reference to said one of said objects with a weak object reference, including decrementing said reference count data for one of said objects;
initiating deletion of said one of said objects when said reference count data for said one of said objects is decremented to a predefined threshold value, without regard to how many weak object references to said one of said objects may exist; and
replacing a specified strong object reference to said one of said objects with a weak object reference by:
creating a companion object that includes a pointer to said one of said objects; wherein said pointer is not a strong object reference to said one of said objects;
generating an object reference to said companion object; and
destroying said specified strong object reference;
wherein said object reference to said companion object comprises a weak object reference to said one of said objects.

8. A computer system, comprising:
a memory storing a plurality of objects, and strong object references to a plurality of said objects;

a makeweak module configured to generate weak object references corresponding to specified ones of said strong object references;

a reference deleting module configured to delete specified ones of said strong object references; and an object management module configured to enable deletion of said one of said objects when less than a predefined threshold number of strong object references to said one of said objects exist in said computer system, without regard to how many weak object references to said one of said objects may exist; and a program linking module, including a primary linker cache and a secondary linker image cache, configured to generate linker images while loading programs for execution and for storing said linker images in said primary and secondary linker caches, each linker image in said primary linker cache including strong object references to objects included in corresponding ones of said loaded programs, each linker image in said secondary linker cache including weak object references to objects included in corresponding ones of said loaded programs, said program linking module further configured to:

move a linker image from said primary linker cache to said secondary linker cache when said primary linker cache is full and space for another linker image is to stored in said primary linker cache;

move a linker image from said secondary linker cache to said primary linker cache when said linker image is to be used to initiate execution of a corresponding program;

when moving a linker image from said primary linker cache to said secondary linker cache, replace said strong object references in said moved linker image with corresponding weak object references; and when moving a linker image from said secondary linker cache to said primary linker cache, replace said weak object references in said moved linker image with corresponding strong object references.

9. The computer system of claim 8, said makeweak module further configured to create a companion object that includes a pointer to said one of said objects and to generate an object reference to said companion object;

wherein said object reference to said companion object comprises a weak object reference to said one of said objects.

10. The computer system of claim 8, including:

a nucleus module configured to store reference count data representing said strong object references to a plurality of said objects, to decrement said reference count data for one of said objects whenever a strong object reference to said one of said objects is destroyed, and to initiate deletion of said one of said objects when said reference count data for said one of said objects is decremented to a predefined threshold value.

11. A computer system, comprising:

a memory storing a plurality of objects, and strong object references to a plurality of said objects;

a makeweak module configured to generate weak object references corresponding to specified ones of said strong object references;

a reference deleting module configured to delete specified ones of said strong object references; and an object management module configured to enable deletion of said one of said objects when less than a predefined threshold number of strong object references to said one of said objects exist in said computer system, without regard to how many weak object references to said one of said objects may exist;

said makeweak module further configured to create a companion object that includes a pointer to said one of said objects, and to generate an object reference to said companion object; wherein said pointer is not a strong object reference to said one of said objects;

wherein said object reference to said companion object comprises a weak object reference to said one of said objects.

12. A computer program product for use in conjunction with a computer system, the computer program product comprising a computer readable storage medium and a computer program mechanism embedded therein, the computer program mechanism comprising:

a plurality of objects stored in said memory;

strong object references stored in said memory, each of said strong object references referencing one of said objects;

an executable makeweak procedure for generating weak object references corresponding to specified ones of said objects;

an executable reference deleting procedure for deleting specified ones of said strong object references; and an object deleting enablement procedure for enabling deletion of said one of said objects when less than a predefined threshold number of strong object references to said one of said objects exist in said computer system, without regard to how many weak object references to said one of said objects may exist;

further including:

an executable program linking procedure, including a primary linker cache and a secondary linker image cache, for generating linker images while loading programs for execution and for storing said linker images in said primary and secondary linker caches, each linker image in said primary linker cache including strong object references to objects included in corresponding ones of said loaded programs, each linker image in said secondary linker cache including weak object references to objects included in corresponding ones of said loaded programs, said program linking procedure including instructions for:

moving a linker image from said primary linker cache to said secondary linker cache when said primary linker cache is full and space for another linker image is to stored in said primary linker cache;

moving a linker image from said secondary linker cache to said primary linker cache when said linker image is to be used to initiate execution of a corresponding program;

when moving a linker image from said primary linker cache to said secondary linker cache, replacing said strong object references in said moved linker image with corresponding weak object references; and when moving a linker image from said secondary linker cache to said primary linker cache, replacing said weak object references in said moved linker image with corresponding strong object references.

13. The computer program product of claim 12, further including:

said makeweak procedure including instructions for creating a companion object that includes a pointer to said one of said objects, and generating an object reference to said companion object;

wherein said object reference to said companion object comprises a weak object reference to said one of said objects.

14. The computer program product of claim 12 further including:

a set of nucleus procedures, including procedures for storing reference count data representing said strong object references to said objects, for decrementing said reference count data for one of said objects whenever a strong object reference to said one of said objects is destroyed, and for initiating deletion of said one of said objects when said reference count data for said one of said objects is decremented to a predefined threshold value.

15. The computer program product of claim 12, further including:

said makeweak procedure including instructions for creating a companion object that includes a pointer to said one of said objects, and generating an object reference to said companion object;

wherein said object reference to said companion object comprises a weak object reference to said one of said objects.

* * * * *